(No Model.)　　　　　　　　　　　　　　　　　4 Sheets—Sheet 1.
D. H. SOLOMON.
DEVICE FOR PREVENTING BANKS FROM CAVING.
No. 449,185.　　　　　　　　　　Patented Mar. 31, 1891.
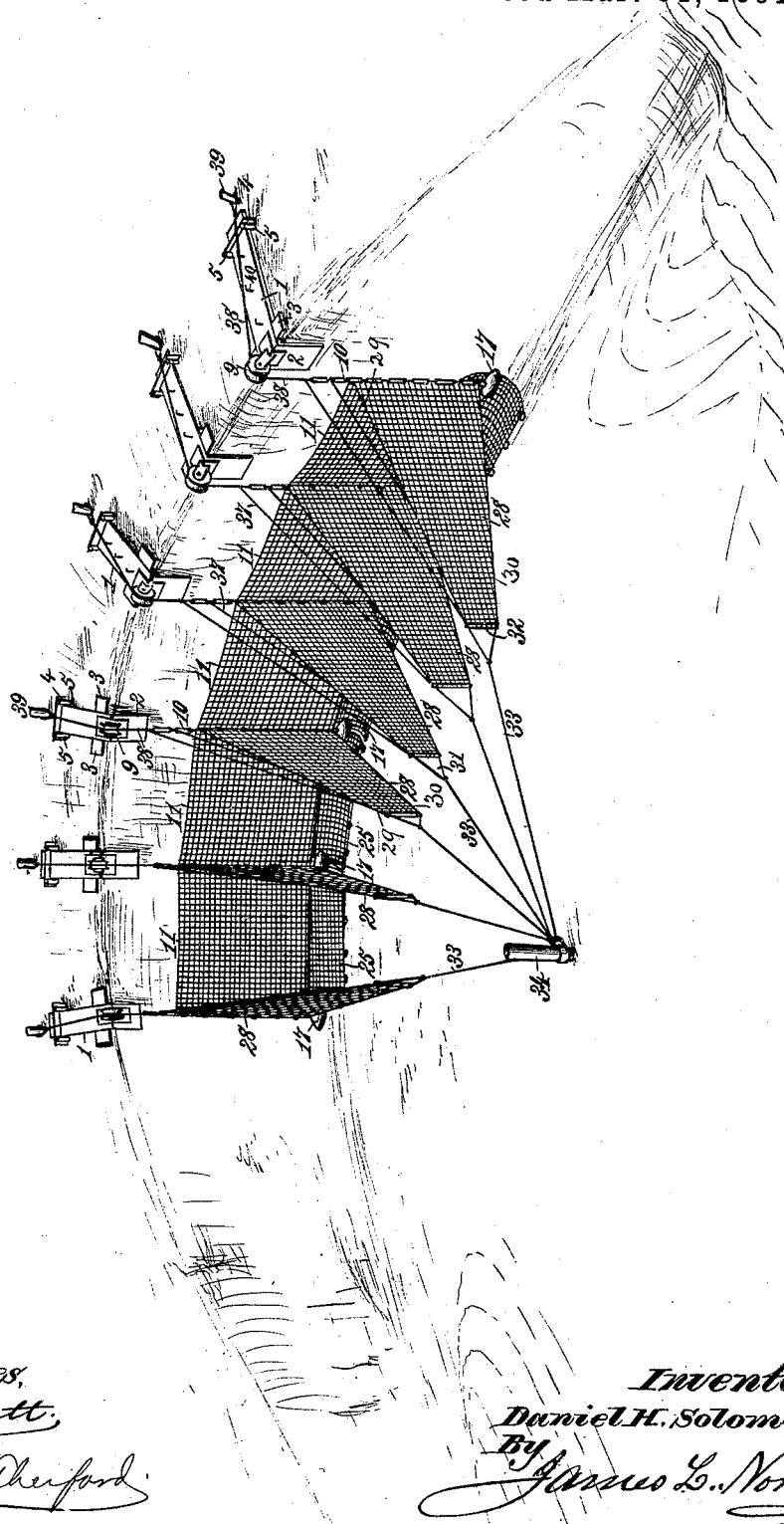

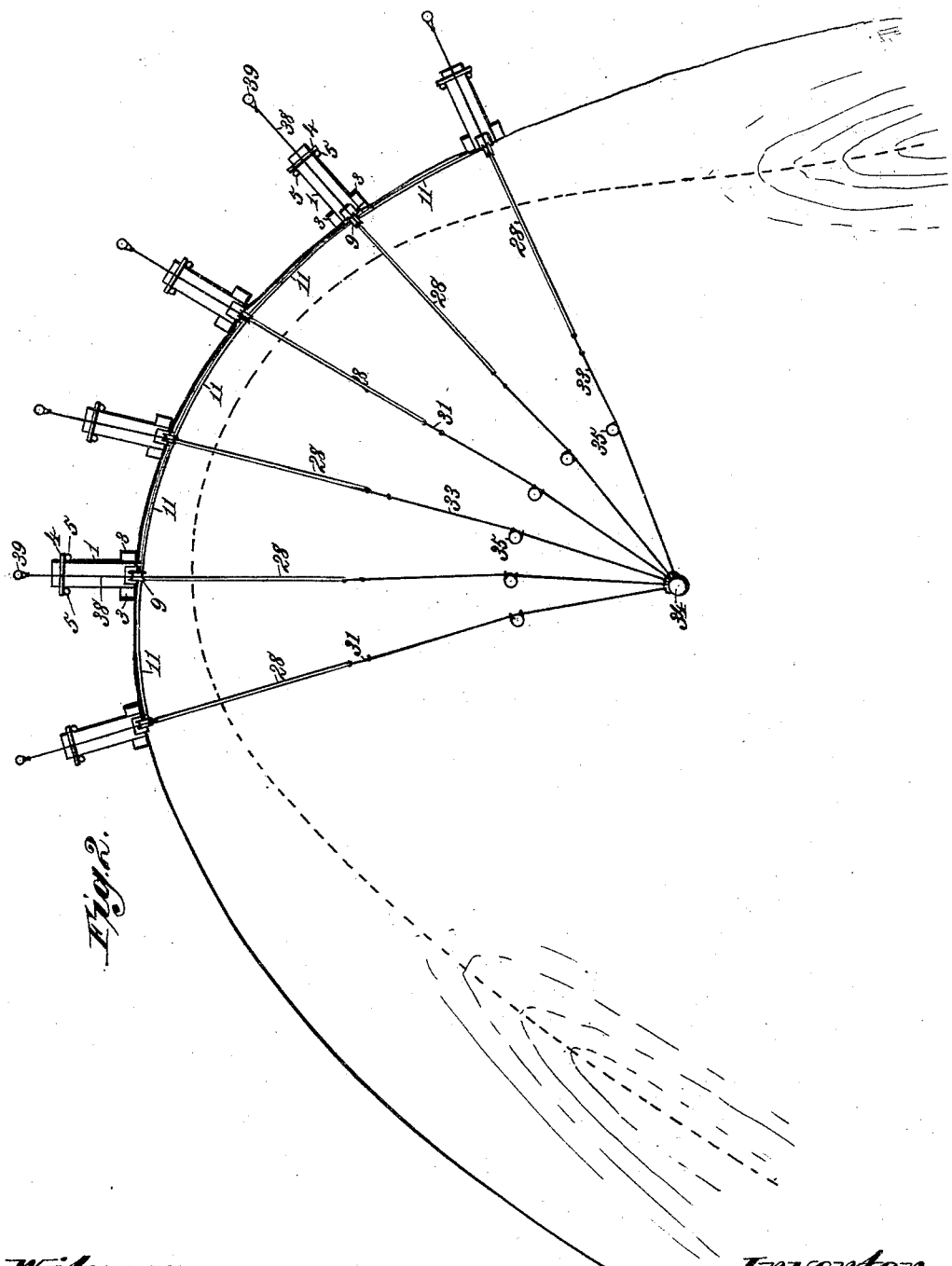

(No Model.) 4 Sheets—Sheet 3.
D. H. SOLOMON.
DEVICE FOR PREVENTING BANKS FROM CAVING.
No. 449,185. Patented Mar. 31, 1891.
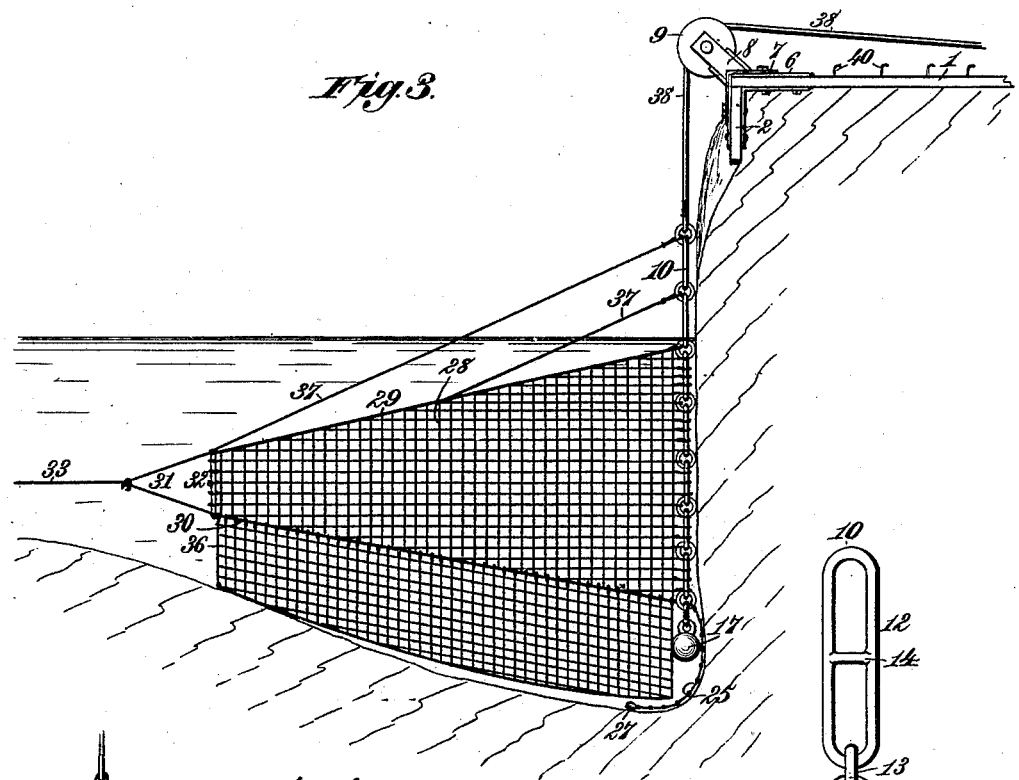
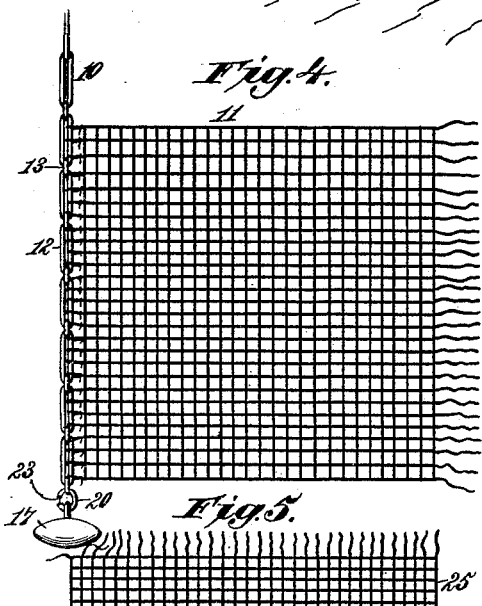
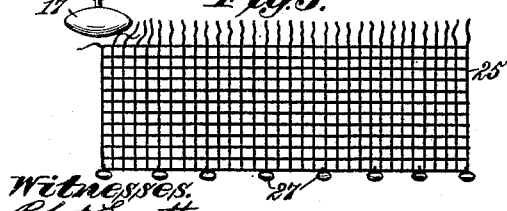
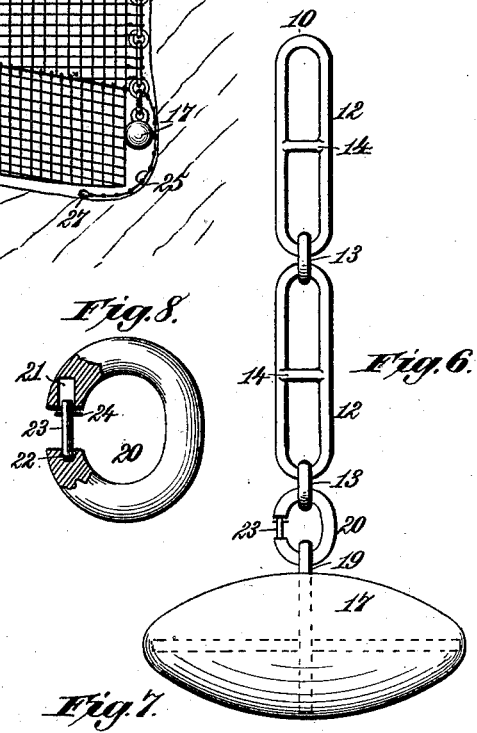
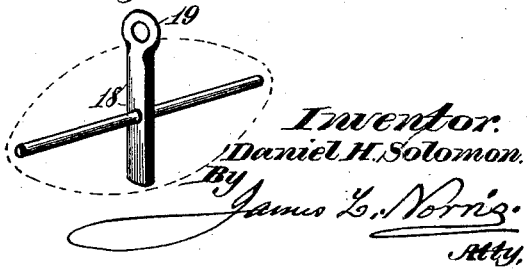
Witnesses.
Inventor.
Daniel H. Solomon.
By James L. Norris.
Atty.

(No Model.) 4 Sheets—Sheet 4.
D. H. SOLOMON.
DEVICE FOR PREVENTING BANKS FROM CAVING.
No. 449,185. Patented Mar. 31, 1891.
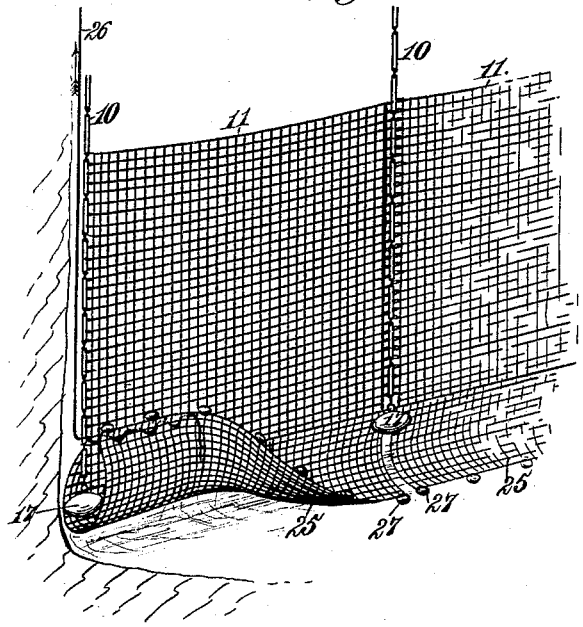
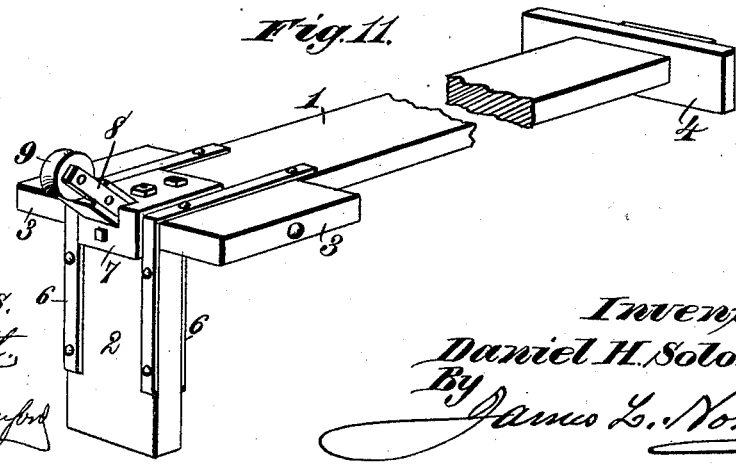

UNITED STATES PATENT OFFICE.

DANIEL H. SOLOMON, OF GLENWOOD, IOWA.

DEVICE FOR PREVENTING BANKS FROM CAVING.

SPECIFICATION forming part of Letters Patent No. 449,185, dated March 31, 1891.

Application filed July 17, 1889. Serial No. 317,837. (No model.)

*To all whom it may concern:*

Be it known that I, DANIEL H. SOLOMON, a citizen of the United States, residing at Glenwood, in the county of Mills and State of Iowa, have invented a new and useful Hanging Protector for the Banks of Rivers and other Water-Courses, of which the following is a full, clear, and exact description, reference being had to the accompanying drawings, forming part of this specification.

My invention has for its object the protection of the banks of a river or other stream of water from undermining and erosion by the force and direction of currents and to effect their gradual restoration by the deposit of sand, silt, and other matter suspended in the water.

The invention is particularly designed to protect and restore the bank on the concave side of a bend in a sediment-bearing river flowing in an alluvial and yielding bed of its own formation, but is applicable to the improvement of navigation and other useful purposes in various situations by warding off or resisting the destructive action of strong currents directed against the bank and by encouraging the deposit of restorative material in comparatively still water at the foot of the bank.

In the annexed drawings, illustrating the invention, Figure 1 is a perspective of my improved hanging protector applied to the concave vertical bank of a stream and provided at intervals with suspended screens or wings that are arranged to project from the main protector, preferably in converging lines. Fig. 2 is a plan of the same. Fig. 3 is an end elevation of the apparatus, showing the arrangement of aprons or borders detachably applied to the lower portions of the protector and its wings. Fig. 4 is an enlarged elevation of one of the suspended mats or woven sections forming part of the main protector. Fig. 5 is a similar view of a portion of the apron or border designed for attachment to the lower edge of the protector or its wings. Fig. 6 is an enlarged view of a portion of one of the heavy metallic chains for suspending the protector, and shows, also, one of the weights for holding the apparatus down when submerged. Fig. 7 is a view of a cross on which the weight is cast. Fig. 8 is a partly sectional view of an open link and its bolt for detachably connecting the weight and the chain from which it is suspended. Fig. 9 is a perspective of a portion of the hanging protector and its attached lower border or apron, showing how the lower edge of the apron is temporarily suspended from the lower part of the protector and subsequently released and spread at the toe of the bank by drawing out the attaching cord. Fig. 10 is a transverse section of a padded protector or mattress. Fig. 11 is an enlarged perspective of one of the supports from which the protector is suspended in front of a bank.

The reference-numeral 1, Figs. 1, 2, 3, and 11, represents a series of supports that are located at suitable intervals along the verge of the bank to be protected, as shown in Figs. 1 and 2, the top of the bank having been previously graded, if necessary, as shown in Figs. 1 and 3, to provide a suitable foundation for said supports.

Referring more particularly to Fig. 11, each of the supports 1 comprises a strong oblong piece of timber that is to be placed on the top of the bank and substantially at a right angle to the vertical wall of the bank at the point to be protected. To the outer end of this support 1 is firmly secured a depending brace-arm 2, that hangs over the verge of the bank substantially parallel to and in contact with its vertical wall, as shown in Figs. 1 and 3. The support 1 may have securely bolted to its forward end on each side the blocks 3, that serve to brace said support laterally and prevent it from sinking in the soil. Near its rear end the support 1 is provided with a cross-bar 4, and in front of the projecting ends of this cross-bar stakes 5 are driven into the ground, as shown in Figs. 1 and 2, to hold the support 1 in position. The support 1 and its depending arm 2 are strongly braced by angular metallic straps 6, between which is secured a metallic angle-plate 7, carrying an arm or bracket 8, in which is supported a grooved wheel or pulley 9 for the chains 10, by which the bank-protector is suspended.

The bank-protector consists of mats or mattresses 11, composed of any suitable material, preferably woven rope, and suspended from the chains 10, between which they are stretched. As shown in Fig. 6, the chains 10 are composed of long double links 12 for attachment of the mats 11, and short circular links 13, that alternate with and connect the long links and render the chains sufficiently flexible to facilitate handling. The oblong links 12 are each about two feet in length and are braced by cross-bars 14, one of which is extended centrally across each of said links. The mats or mattresses 11 are made in sections, each preferably about four and a half feet or more in width, to extend across and connect with two or more of the oblong chain-links, and to lap each other at their upper and lower edges, where they are securely sewed together or otherwise strongly connected after being attached to the chains. These mat-sections or mattresses may be from thirty to fifty feet in length, more or less, according to the configuration of the bank to be protected and the distance between the vertical suspending chains.

In manufacturing the mat-sections 11 the ends of the warps or horizontal threads are preferably left free, as shown in Fig. 4, to serve as a means for attaching the mats to the chains.

If desired, the protector may be composed of a double thickness of mats or suitable woven material 11, filled in with an intervening padding or stuffing 15, of some suitable substance, and preferably quilted or tied together at 16, as shown in Fig. 10.

In order to hold the submerged mats or mattresses 11 as close as possible to the bank, heavy weights 17 are attached to the lower ends of the chains 10, as shown. These weights 17 are preferably cast on crosses 18, Fig. 7, each of which is composed of a short vertical arm and a long horizontal arm. In the upper end of the cross 18 is an eye 19 for engagement of an open elliptical link 20, Fig. 8, by which the weight 17 is detachably connected with the chain 10, as shown in Fig. 6. The link 20, which is open on one side, is provided with opposite upper and lower recesses 21 and 22 to receive and hold a removable bolt 23, that is adapted to close the open side of the link after it has been connected with the weight and chain. It will be observed by reference to Fig. 8 that the upper recess 21 is of much greater depth than the lower recess 22, so that by first inserting the upper end of the bolt 23 into the recess 21 the said bolt can then be allowed to drop back into the lower recess 22, after which by passing a pin 24 transversely through an orifice in said bolt below the upper recess 21, the bolt will be held securely and cannot be jolted out of place. The weight 17, attached to the chain that is farthest up stream, should be sufficiently heavy to hold the mat or mattress closely against the bank and prevent the water from getting behind the mat in any great quantity. While the chains 10 may be of varying length and submerged more or less, according to the depth of the water at different points, they should not in any instance be so long or payed out so far as to cause the weights 17 to rest on the bottom, for this would destroy their function of holding the chains and mats in a vertically-extended position.

As erosion and scour are usually more violent and destructive at the toe of a vertical or nearly vertical bank than elsewhere, this point should be carefully and fully guarded. This is best accomplished by extending the protector apparatus downward and outward beyond the suspended weights 17, as shown in Figs. 1, 3, and 9, by means of detachable borders or aprons 25, Fig. 5, of woven material attached to the lower portions of the mattresses or mats 11 back of the chains 10 and attached weights 17, so that said borders or aprons will lie in close contact with the bank at its junction with the bottom or bed of the streams.

In order to insure the spreading outward of the borders or aprons 25 and cause them to become properly extended and not heap up back of or beneath the mats when the apparatus is submerged, it is advisable to draw the said aprons or borders forward beneath the weights 17 and then upward in front of the mats 11, and temporarily attach the lower edges of said borders or aprons to the front of the mats by means of a drawing-cord 26, engaging the meshes of the mats and aprons, so that after the protector has been lowered to the proper depth the cord 26, which extends to the top of the bank, can be withdrawn to release the apron or border 25, as shown in Fig. 9, and cause it to spread out and be suspended against the toe of the bank, as clearly represented in Fig. 3. The proper spreading of the aprons 25 when released, as above described, may be facilitated by means of weights 27, attached to their lower edges, and serving also to hold said aprons onto the bottom. By means of the mats or mattresses 11 and attached lower borders or aprons 25 the force of currents will be broken and warded off from the bank, so as to prevent its cutting and erosion, while so much of the water as may pass through the closely-woven mats or mattresses or get behind the same will be so calm that its sediment will gradually be deposited, and so in time fill the space in the rear of the protector due to unevenness of the bank or other causes. It will thus be seen that this hanging protector is capable of performing an important function in the rectification of channels and the attainment of a "mean smooth bottom," while the weight of the apparatus, together with the impact of the water against the outer sides of the mats or mattresses, will resist any tendency to outward movement of the bank.

Besides acting as an effectual protector for the bank, the suspended chains 10 and mats or mattresses 11 will serve as a hanging vertical wall or base for the attachment of vertical screens 28, that are extended outward from said chains, preferably in converging lines, across the pool or space in front of a concave bank or other desired location, as shown in Figs. 1 and 2. These screens or wings 28 may be woven from wire or other suitable material, and, by their frictional resistance and obstruction to the flow of water, will break the force of currents and reduce their velocity below the point at which silt or sediment can be transported, thus causing the same to become precipitated and remain stationary at the bottom of the pool, which may thus be gradually filled, so as to still further protect the bank and assist in its restoration. These screens 28 can thus be very effectively employed in connection with river-bar harrows or channel-plows at work above the point where said screens are located, so that the floating débris loosened and removed by said implements will be arrested and become deposited in the pool in which the screens are placed.

The screens 28 are preferably supported by cables 29 and 30, attached at their inner ends to the chains 10, as shown in Fig. 3. At their outer ends the cables 29 and 30 converge and form a bridle 31, which may be stayed by a brace or cross piece 32 at the outer end of the screen, and each bridle 31 connects with a cable 33, that is extended to a snub-post 34, Figs. 1 and 2, located in the stream or on the opposite shore. If desired, a number of intermediate stakes 35, Fig. 2, may be placed at suitable points between the snub-post 34 and screens 28 for the purpose of regulating the direction and altitude of the cables 33, as may be required. The lower edges of the screens 28 may be provided, if desired, with detachable borders or aprons 36, similar to the borders or aprons 25 attached to the mats or mattresses 11, and conforming at their lower edges to the configuration of the bottom or bed of the stream, thereby further assisting to retard currents, prevent erosion, and encourage the deposit of material in the pool. In order to further stay the screens and assist in holding them erect, they may be provided with guy-ropes 37, extending to the chains 10 by which the protector is supported. These chains 10 are preferably supported by cables 38, passed over the grooved wheels or pulleys 9, and secured to posts or stakes 39, driven into the top of the bank in rear of the supports 1, before described.

In placing the apparatus in position the mats or mattresses and the screens are attached to the chains 10 and properly connected, one section after another, as the chains are gradually lowered into the water over pulleys 9, the cables 38, by which the chains are played out and supported, being connected with capstans or windlasses, (not shown,) so that the descent of the apparatus into the water can be readily controlled. For the purpose of temporarily holding the chains while the mat-sections are being successively attached, hooks 40 or other suitable devices may be provided on the supports 1, if desired. The weights 17 are preferably not attached to the chains 10 until after the lower mats or mattresses have been placed in position and the chains lowered to the surface of the water, when said weights can be conveyed to the proper points and hung onto the chains by the use of boats or pontons. Some of the chains 10 and attached mats or mattresses may be submerged to greater depths than others, according to the configuration of the bottom at various points, the separate connection of each cable 38 with one of a series of capstans being thus a feature of great importance in enabling the apparatus to be properly submerged and located.

By means of the separate cables and capstans the protector can be readily lowered, supported, and raised, as required; but when the apparatus has been arranged in proper position it may be preferable to remove the capstans and secure the cables 38 to stakes 39 in rear of several supports 1, as shown.

I would have it understood that I do not confine myself in every particular to the precise construction and arrangement of parts herein shown and described, as various modifications can be made without departing from my invention, the distinguishing features of which are a series of independent vertically-suspended chains that are weighted or made of sufficient weight to remain in a perpendicular position when submerged mats, or mattresses of any suitable material attached to and extended between said chains to form a hanging wall or protector for the bank, and wings or screens projecting from said protector at suitable angles to break the force of currents, prevent cutting or erosion of the bank, and promote the deposit of restorative material.

What I claim as my invention is—

1. In an apparatus for protecting the banks of rivers from cutting and erosion, a protector adapted to be suspended vertically from the bank and composed of independent parallel and vertical chains, mats or mattresses attached to and extended between said chains, and vertical wings or screens attached to said chains and extended outward at an angle to the mats, substantially as described.

2. In a hanging protector for the banks of rivers, the combination, with a series of parallel suspended chains composed of alternate long and short links, of mats or mattresses extended between and supported by said chains, substantially as described.

3. In a hanging protector for the banks of rivers, the combination, with a series of parallel suspended chains composed of alternate long and short links, of mats or mattresses arranged in sections, each of which is attached to two or more long links of said chain, substantially as described.

4. In a hanging protector for the banks of rivers, the combination, with two or more parallel vertically suspended chains and a submerged mat or mattress attached to and extended between said chains, of an apron or border attached to the lower portions of said chains and mat and extended downward and outward below the same to protect the toe of the bank, substantially as described.

5. In a hanging protector for the banks of rivers, the combination, with two or more independent parallel vertically-suspended chains at a point above the river-bottom and a mat or mattress attached to and extended between said chains, of weights attached to the lower ends of the chains to maintain the protector in a vertical position, substantially as described.

6. In a hanging protector for the banks of rivers, the combination, with parallel vertically-suspended chains, weights attached to the lower ends of said chains, and mats or mattresses attached to and extended between the chains, of a border or apron attached to the lower portions of the chains and mat in the rear of said weights and extended downward and forward below the weights, substantially as described.

7. In a hanging protector for the banks of rivers, the combination, with parallel vertically-suspended and weighted chains and a mat or mattress attached to and extended between said chains, of a border or apron attached to the lower portions of said chains and mat, and a drawing-cord for temporarily attaching the lower edge of said border or apron to the front of the mat, whereby when the apparatus is submerged the said drawing-cord can be withdrawn to release the border or apron and cause it to spread outward in front of the toe of the bank to protect the same, substantially as described.

8. In a hanging protector for the banks of rivers, the combination, with parallel suspended chains, of woven mats or mattresses having the warp-threads or fibers thereof free at their ends to serve as a means of attachment of said mats or mattresses to the said chains, substantially as described.

9. In a hanging protector for the banks of rivers, the combination, with weighted and vertically-suspended chains, of vertical screens attached at one end to said chains, and a snub-post and cable for supporting the other ends of said screens, substantially as described.

10. In a hanging protector for the banks of rivers, the combination, with vertically-suspended chains and mats or mattresses attached to and extended between said chains, of vertical screens or wings attached at their inner ends to said chains and extended outward in and across the pool in front of the bank, substantially as described.

11. In a hanging protector for the banks of rivers, the combination, with weighted chains suspended vertically from the banks and mats or mattresses attached to and extended between said chains, of borders or aprons attached to the lower portions of said chains and mats, wings or screens attached at their inner ends to the chains and extended outward in the pool in front of the bank, and borders or aprons attached to the lower edges of said screens, substantially as described.

12. In a hanging protector for the banks of rivers, the combination, with weighted vertically-suspended chains and mats or mattresses attached to and extended between said chains, of wings or screens attached at one end to said vertical chains, cables connected with the other ends of said wings or screens, and a snub-post to which said cables are connected for supporting the screens in the water, substantially as described.

13. In a hanging protector for the banks of rivers, the combination, with a series of supports located on the bank, and each provided with a pulley or grooved wheel, of a hanging protector composed of vertical chains, and mats or mattresses attached to and extended between said chains, and cables passed over said pulleys and attached to the said chains for the purpose of lowering, supporting, and raising said hanging protector, substantially as described.

14. The combination of the supports 1, provided with pulleys 9, the cables 38, passed over said pulleys, the chains 10, attached to and suspended from said cables, and the mats or mattresses 11, attached to and extended between the said chains, substantially as described.

15. The combination of the vertically-suspended chains 10, the mats or mattresses 11, attached to and extended between said chains, the wings or screens 28, attached at their inner ends to the chains 10 and extended outward from the mats or mattresses 11, the cables 33, connected with the outer ends of said screens, and a stake or stakes for attachment of said cable to support the said screens in the water, substantially as described.

16. The combination, with the vertically-suspended chains 10, weights 17, and mats or mattresses 11, of the borders or aprons 25, substantially as described.

17. The combination, with the vertically-suspended and weighted chains 10 and the wings or screens 28, of the borders or aprons 36, substantially as described.

18. The combination of the vertically-suspended and weighted chains 10, mats or mattresses 11, wings or screens 28, bridles 31, cables 33, snub-post 34, and guy-ropes 37, substantially as described.

19. The combination of the vertically-suspended chains 10, composed of long double links 12 and short links 13, the weights 17, and the mats or mattresses 11, attached to and extended between said chains, substantially as described.

20. The combination, with the vertically-suspended chains 10, and mats or mattresses 11, attached to and extended between said chains, of the detachable weights 17, provided with eyes 19, and the open links 20, provided with bolts 23 for connecting said chains and weights, substantially as described.

21. The combination, with a screen 28, of a weighted chain 10 for suspending the screen at one end adjacent to the bank of a river, and a snub-post 34 and cable 33 for supporting the screen at the other end, substantially as described.

Glenwood, Iowa, July 5, 1889.

DANIEL H. SOLOMON.

Witnesses:
HENRY EVERSHAM, Jr.,
FRANCIS W. PARSONS.